(12) United States Patent
Torres et al.

(10) Patent No.: US 8,534,737 B2
(45) Date of Patent: Sep. 17, 2013

(54) TRUNK OF A MOTOR VEHICLE

(75) Inventors: Carlo Franco Torres, Turin (IT);
Armando Spagnolini, Turin (IT);
Stefania Betrone, Turin (IT); Gianpiero Valsania, Turin (IT); Caterina Cavagliato, Turin (IT)

(73) Assignee: Fiat Group Automobiles S.p.A., Turin (IT)

( * ) Notice: Subject to any disclaimer, the term of this patent is extended or adjusted under 35 U.S.C. 154(b) by 0 days.

(21) Appl. No.: 13/469,199

(22) Filed: May 11, 2012

(65) Prior Publication Data
US 2013/0009419 A1  Jan. 10, 2013

(30) Foreign Application Priority Data

May 11, 2011 (EP) .................................... 11425131

(51) Int. Cl.
*B60R 5/04* (2006.01)
(52) U.S. Cl.
USPC ......................................... 296/37.16; 108/44
(58) Field of Classification Search
USPC ..................... 296/37.16, 24.43, 37.3; 108/44
See application file for complete search history.

(56) References Cited

U.S. PATENT DOCUMENTS 5,669,537 A * 9/1997 Saleem et al. ................ 224/539
5,970,884 A * 10/1999 Taille et al. .................... 108/44

FOREIGN PATENT DOCUMENTS

| DE | 202005019937 | 3/2006 |
|---|---|---|
| EP | 1650082 A1 | 4/2006 |
| FR | 2899169 A1 | 10/2007 |
| JP | 2009298181 | 12/2009 |

* cited by examiner

*Primary Examiner* — Joseph Pape
(74) *Attorney, Agent, or Firm* — Dickstein Shapiro LLP

(57) ABSTRACT

A trunk of a motor vehicle having an opening providing access from the outside, a floor, two side walls substantially transversal to the floor, a load platform, which is defined by a first edge facing the opening, by a second edge substantially parallel to the first edge and by two side edges substantially transversal to the first and second edge; the trunk being further equipped with two shelves, each of which is integral with a respective side wall and has a respective groove overlooking the groove of the other first shelf and adapted to be slidingly engaged by a respective said side edge in order to arrange and keep the load platform stable in a tilted position with respect to the floor.

15 Claims, 6 Drawing Sheets

TRUNK OF A MOTOR VEHICLE

TECHNICAL FIELD OF THE INVENTION

The present invention relates to a trunk of a motor vehicle, in particular a road motor vehicle.

STATE OF THE ART

Generally, the trunk of a motor vehicle, e.g. a car, is defined by two side walls, normally consisting of the sides of the motor vehicle, and by a floor, which normally consists of the vehicle floor of the motor vehicle and is preferably curved to define a compartment adapted to contain a spare wheel and/or other equipment.

As is known, the trunk may also comprise a load platform, which normally extends from one side wall to the other and may be moved in height between a lowered position next to the floor and at least one raised, substantially horizontal position, in which the load platform divides the trunk into a top and a bottom area.

The horizontal raised position may be defined by gripping devices supported by the side walls and adapted to be engaged by corresponding hooking devices supported by the load platform; or, more simply, the load platform may be arranged to rest on shelves protruding from the side walls, or obtained in the side walls themselves, at a specific distance from the floor. A solution of this type is described, for example, in registered EP 2105352 entitled to the applicant of this application.

Lastly, in order to make the floor of the trunk accessible, and in particular the compartment containing the spare wheel, the load platform is known to be left free to rotate, starting from its lowered position, upwards and about a front edge thereof in such a way as to take on a tilted position. Since the removal operations of the spare wheel are often difficult, especially due to the weight of the spare wheel itself, the need was felt to keep the load platform in the tilted position in such a way as to leave both of the operator's hands free.

To meet this need, a proposal was made to introduce blocking devices connected to the side walls and adapted to stably engage respective sections of the load platform when it is rotated towards the tilted position. A solution of this type is described, for example, in EP 1806261, in which the mentioned blocking devices consist of elastic retaining elements connected to the side walls or directly obtained on a liner surface of the side walls themselves.

Although it is effective, this solution involves the drawback of introducing a further structural complication in the trunk, to the detriment of the affordability, simplicity and reliability of the structures defining the trunk itself.

DESCRIPTION OF THE INVENTION

The object of the present invention is to make a trunk for a motor vehicle, said trunk being equipped with a load platform which can be moved in height and tilted, and free from the above-described drawback.

According to the present invention, a trunk is made for a motor vehicle according to the accompanying claims.

BRIEF DESCRIPTION OF THE DRAWINGS

The present invention will now be described with reference to the accompanying drawings, which illustrate a non-limiting exemplary embodiment thereof, in which.

PREFERRED EMBODIMENTS OF THE INVENTION

Figure 1:
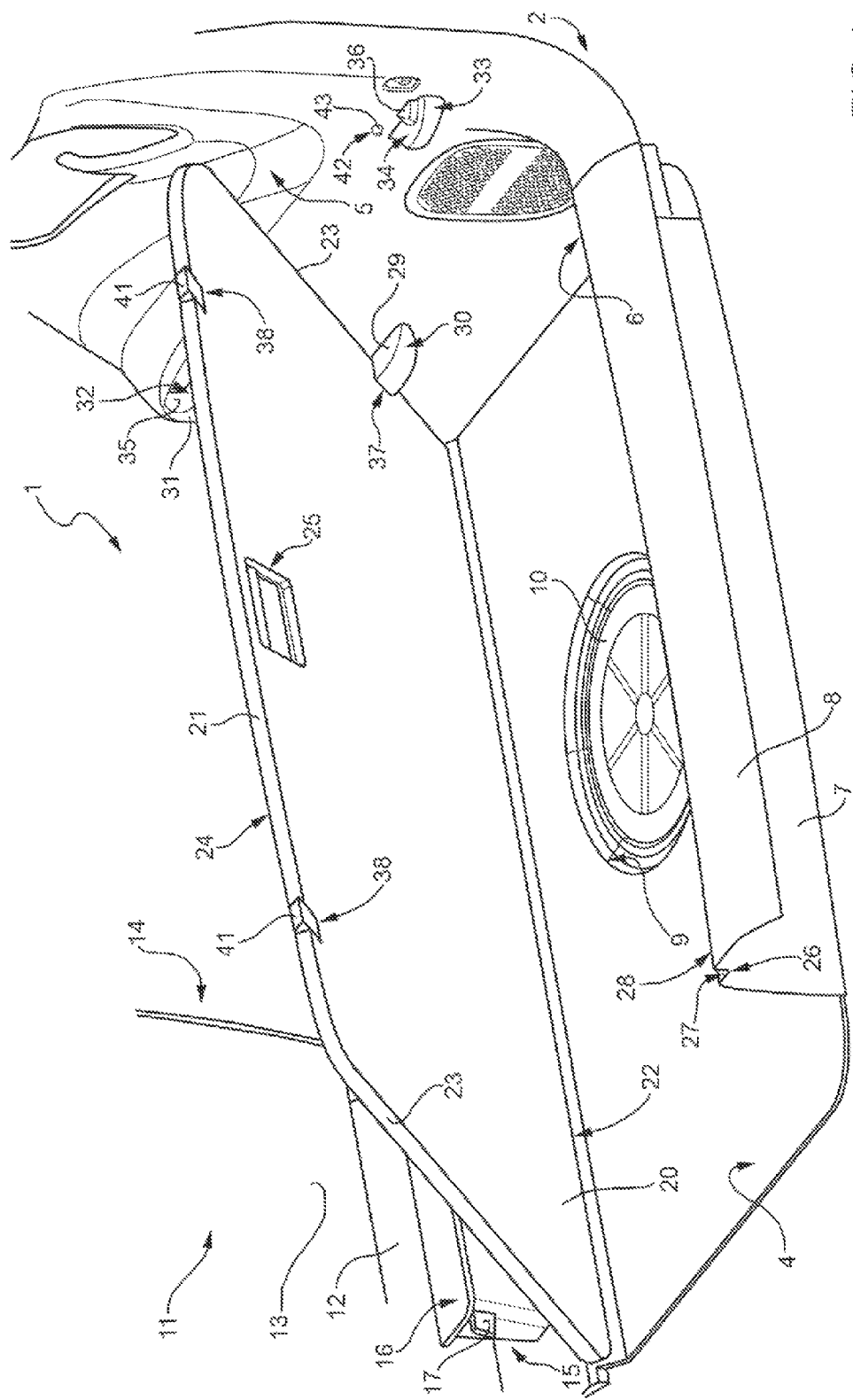
FIG. 1 is a perspective view, with parts removed for clarity, of a preferred embodiment of the trunk of the present invention.

Numeral 1 in FIG. 1 indicates the trunk as a whole of a motor vehicle 2, in this case a car.

The trunk 1 is arranged in the rear section of the motor vehicle 2 immediately behind a passenger compartment and is defined, in known manner, by a floor 4, which consists of a rear portion of a vehicle floor of the motor vehicle 2, and of two side walls 5 (only one of which is shown), which consist of respective sides of the motor vehicle 2 which are substantially parallel to each other and traversal to the floor 4.

Trunk 1 is closed at the top by a top wall (not shown), which in conjunction with the side walls 5, is part of the body of the motor vehicle 2, and communicates with the outside by means of an opening 6 closed by a liftgate (not shown) and bottomly defined by an extension 7, which is raised off the floor 4 by a determined height, transversally extends to the side walls 5 and has a top edge 8 curved outwards and defining a resting area (so-called luggage partition) for luggage during the loading thereof inside trunk 1.

Figure 4:
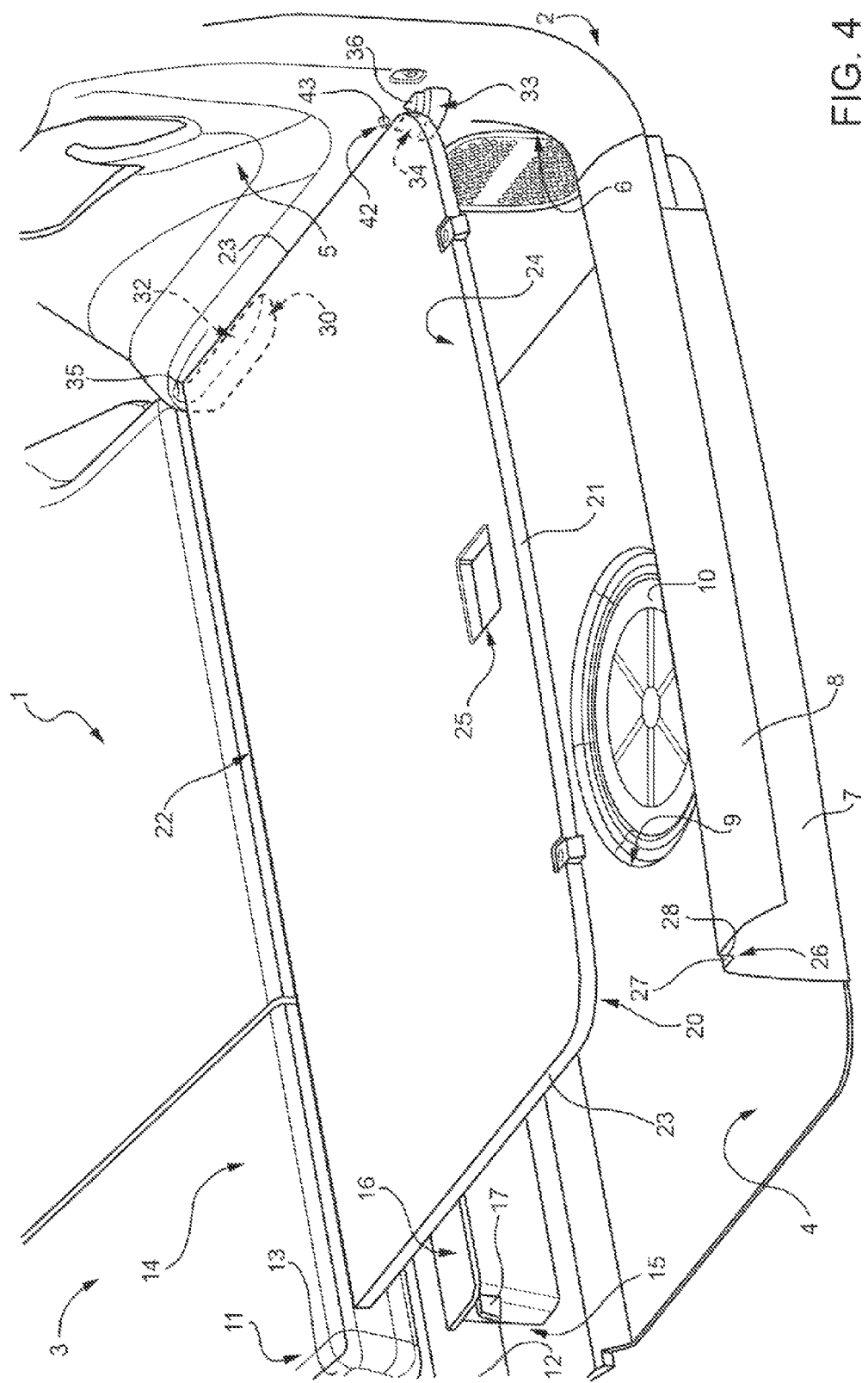

According to that shown in FIGS. 1 and 4, the floor 4 is centrally curved in such a way as to define a housing compartment 9 for a spare wheel 10.

Trunk 1 is frontally defined and separated by the passenger compartment 3 by means of a seat 11 (partially shown), which defines a second or a third row of seats accommodated in the passenger compartment 3, and is of split type and comprises a chair-seat 12 and a backrest 13, which with respect to the chair-seat 12, is tiltable about a horizontal axis perpendicular to the longitudinal advancement direction of the motor vehicle 2 in such a way as to be tiltingly adjusted ergonomically and to be able to take on a forward lowered position (shown in FIG. 3), in which the assembly of a rear portion of the passenger compartment 3 and trunk 1 define a single environment. Backrest 13 is limited on the section facing trunk 1 by a surface 14 which is substantially flat and when backrest 13 is in the mentioned lowered position, is turned upwards.

Figure 2:
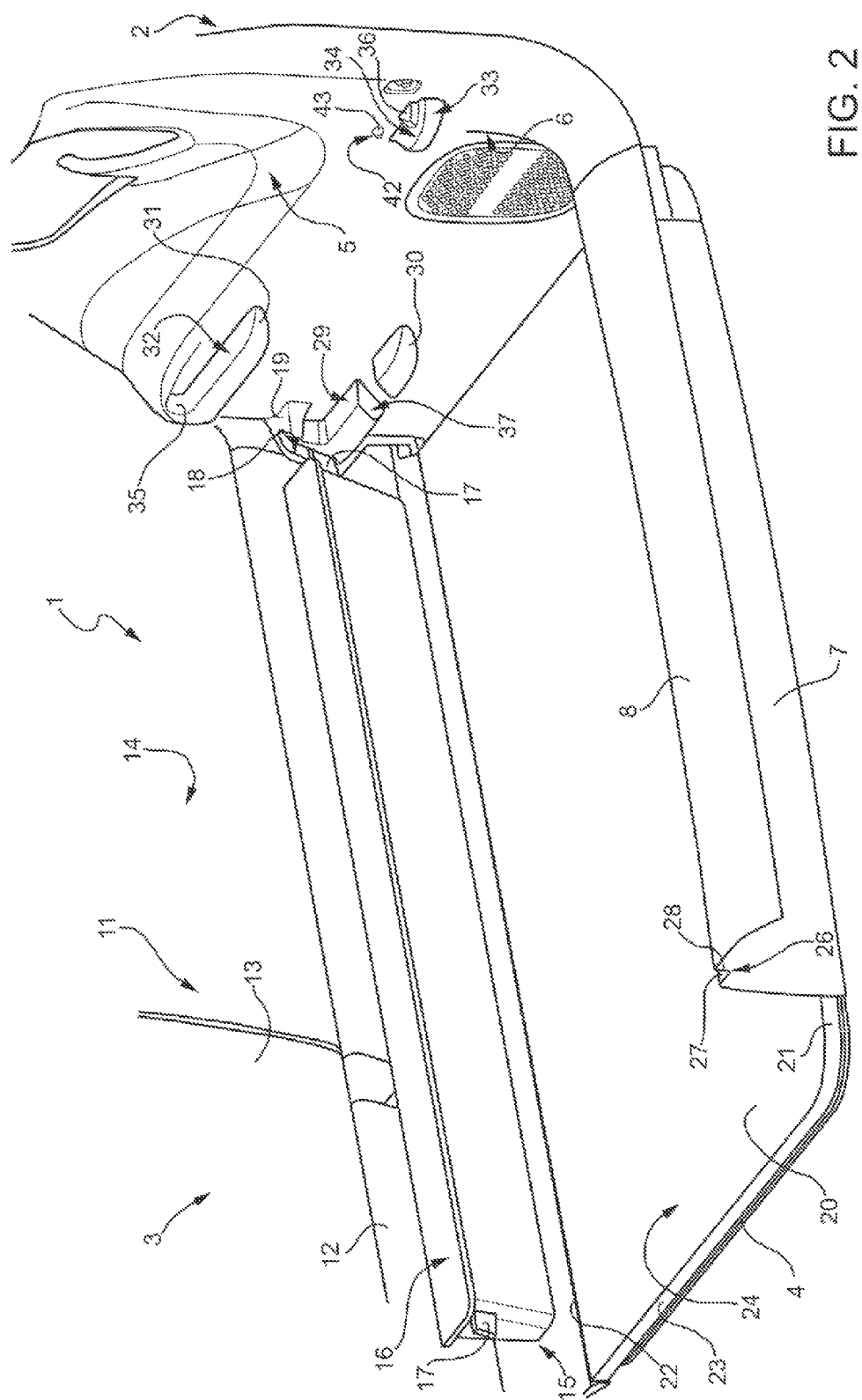
FIGS. 2 to 4 show the trunk in FIG. 1 in respective further operating configurations.
Figure 5:
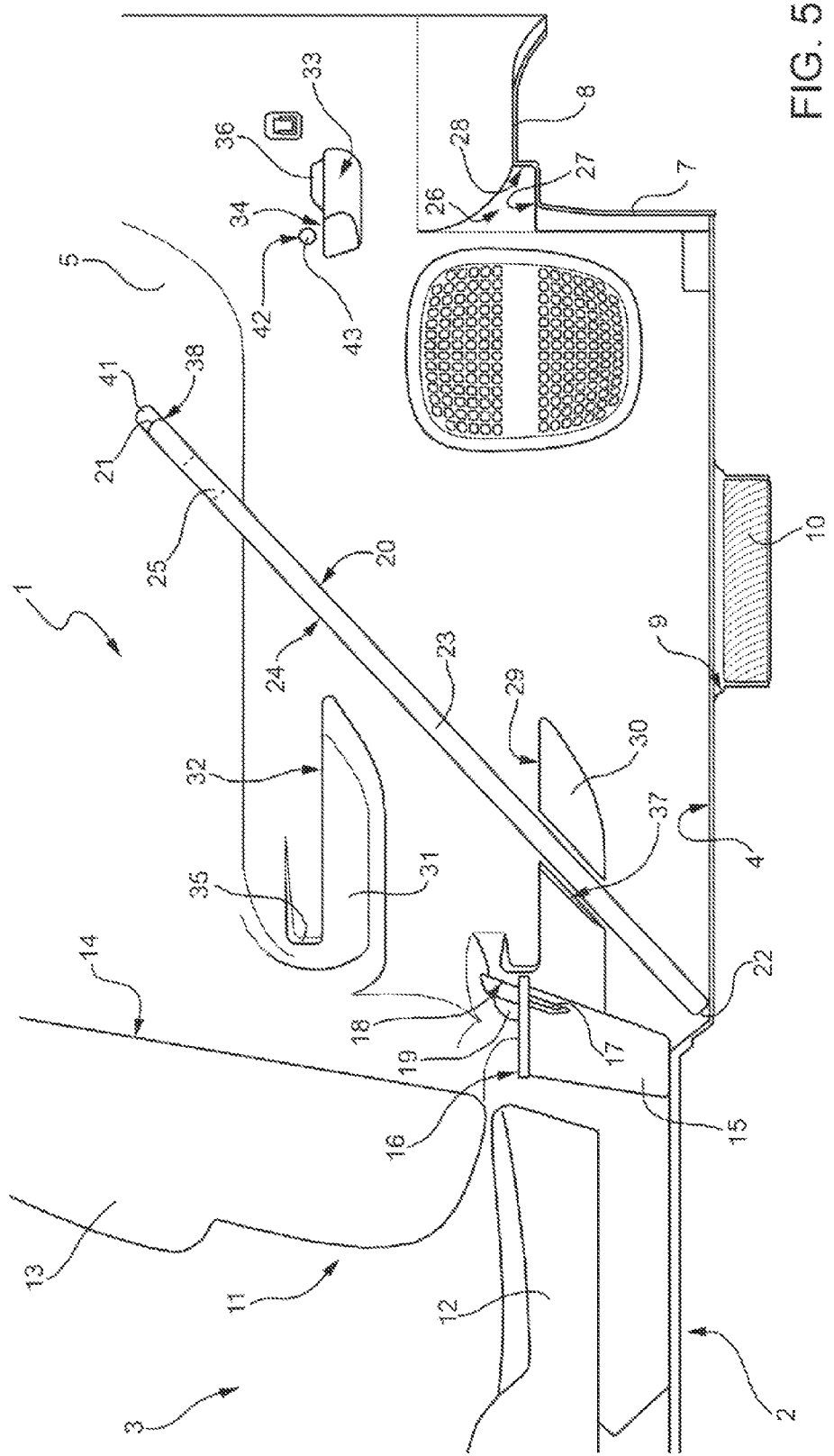
FIG. 5 is a side view of the trunk in FIG. 4.

According to that shown in FIGS. 2 and 5, at the level of the seat-chair 12, trunk 1 is frontally defined by a partition 15 which is arranged behind the seat-chair 12 itself, is removably coupled with the side walls 5, and transversally extends from one of the side walls 5 to the other.

In particular, partition 15 consists of an elongated body, which is arranged to rest on a raised portion of the vehicle floor at a slightly higher level with respect to floor 4, has a trapezoidal cross section tapered towards the bottom and is upwardly defined by a top flat surface parallel to floor 4. Lastly, partition 15 rigidly bears, at each of the axial ends thereof, a connected longitudinal fin 17, which slidingly engages in a substantially vertical slit 18 obtained in a respective rib 19 rigidly connected to a respective side wall 5; preferably the ribs 19 are integral with the respective side walls 5, for example may be part of the structural covering of the respective side walls 5 themselves.

Lastly, trunk 1 comprises a load platform 20, which is defined by a rectangular panel whose width is approximately equal to the width of floor 4 and defined by a substantially straight rear edge 21 facing and parallel to edge 8, by a front edge 22 facing seat 11 and parallel to the rear edge 21, and by two side edges 23 parallel to each other, substantially perpendicular to the edges 21 and 22 and each adjacent to a respective side wall 5. The load platform 20 is limited, on the side opposite to floor 4, by a top flat surface 24 defining, in use, the resting surface for the luggage.

The load platform 20 may be manually moved into trunk 1 at a plurality of predefined height levels, at each of which the load platform 20 is parallel to floor 4. Moreover, the load platform 20 may be tilted upwards in such a way as to leave the access to floor 4 free by means of opening 6 and hence, to compartment 9. To this end, the load platform 20 has a through cavity in proximity of and halfway to the rear edge 21, defining a handle 25 adapted to allow, in use, the load platform 20 to be easily grasped by an operator to move it within trunk 1.

Figure 3:
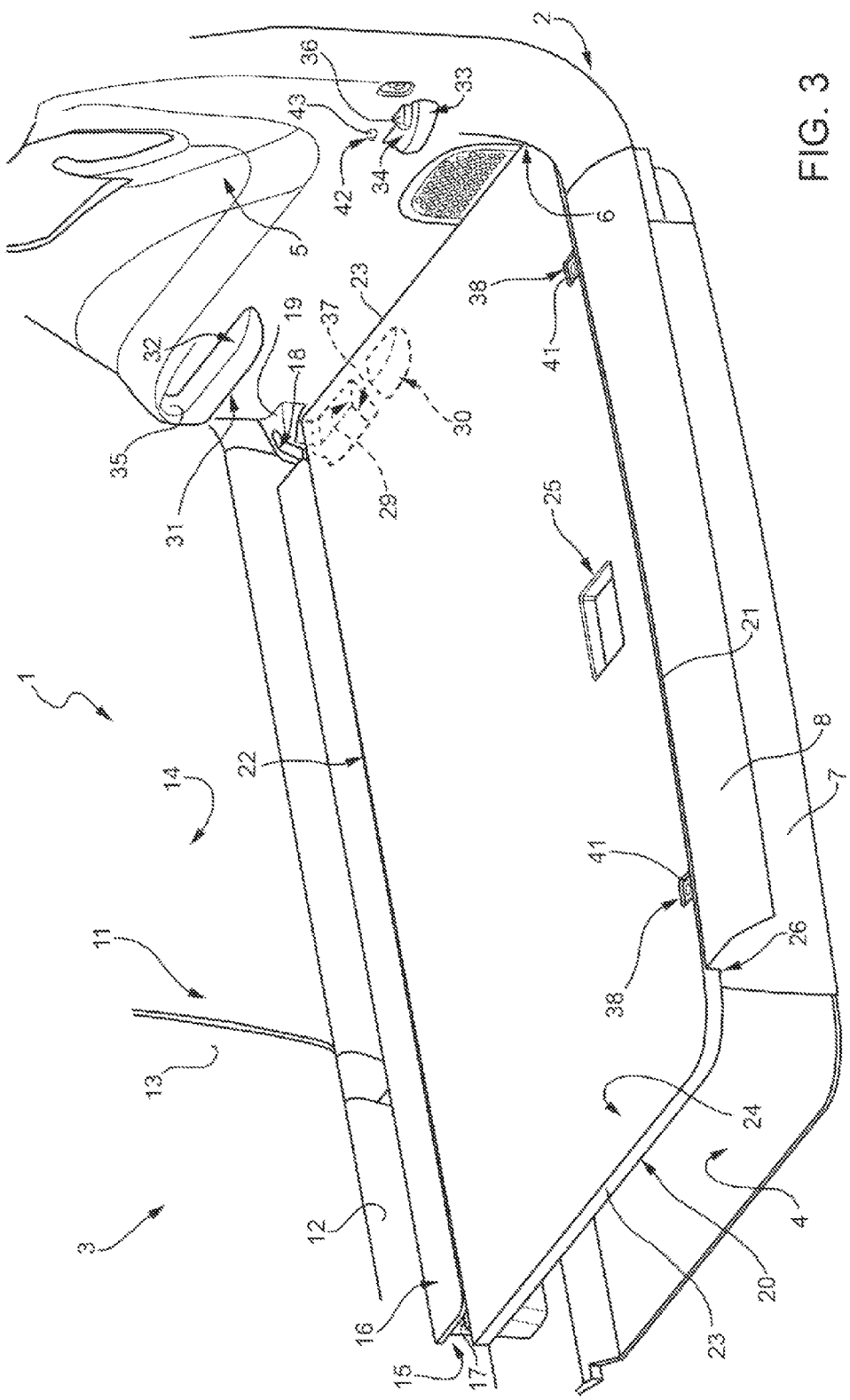

In particular and with reference to FIGS. 2, 3 and 4, the load platform 20 may be manually moved to take on positions at three heights: a lowered position (shown in FIG. 2), in which the load platform 20 is resting on and completely covering floor 4; a first raised, substantially horizontal position (shown in FIG. 3), in which the front edge 22 is arranged to abut against partition 13, the top surface 24 is substantially coplanar to the top surface 16 of partition 13 itself and the load platform 20 divides trunk 1 into a bottom closed space and into a top space communicating with opening 6; and a second substantially horizontal, raised position (shown in FIG. 4), in which the load platform 20 is arranged above edge 8 and divides trunk 1 into a bottom space and into a top space, both communicating with opening 6.

Moreover, when seat 11 is arranged in its lowered position and the load platform 20 is arranged in the second raised position, the front edge 22 abuts against backrest 13 and the top surface 24 is coplanar to surface 14 of backrest 13 itself, in such a way as to define, with surface 14 itself, a substantially continuous load surface.

1) According to that shown in FIG. 3, the load platform 20, in the first raised position, is stably arranged resting on three support planes which are coplanar with each other and arranged at the respective sides of the load platform 20 itself. In particular, in this position the rear edge 21 engages a step 26, which is obtained along an inner margin of edge 8 and is formed by a horizontal resting surface 27 and by a shouldering surface 28 substantially transversal to the horizontal surface 27 and adapted to prevent, in use, together with partition 13, accidental movements of the load platform 20 in the longitudinal advancement direction of the motor vehicle 2; and the side edges 23 are resting on respective horizontal surfaces 29, each of which is defined at the top by a respective shelf 30 overhanging from a corresponding side wall 5 in proximity of partition 13 and rigidly connected to the side wall 5 itself. Preferably, each shelf 30 is integral with the side wall 5, for example may consist of an integral part of the structural covering of the side wall 5 itself. Moreover, each rib 19 is preferably joined with the respective shelf 30 thereof to form a single body and to define, on the body itself, a shoulder adapted to be engaged by the front edge 22 to define an end-stop for the load platform 20 arranged in the first raised position.

According to that shown in FIG. 4, in the second raised position, the load platform 20 is stably arranged resting on two support planes which are coplanar with each other and adapted to each be engaged by a respective side edge 23 of the load platform 20. In particular, each support plane is defined by a pair of shelves which are integral with a respective side wall 5 and comprise a first shelf 31, which is arranged at a height higher than shelf 30 and has a horizontal groove 32 adapted to be engaged by a front portion of a side edge 23 of the load platform 20, and a second shelf 33, which is arranged in proximity of opening 6 and has a top horizontal resting surface 34 which is coplanar to the bottom horizontal surface of groove 32.

Each groove 32 is closed, at the end thereof opposite to the one facing the respective shelf 33, by a bottom shoulder 35 defining an end-stop for the load platform 20. Each shelf 33 in turn has a projection on the horizontal surface 34 thereof defining an end-stop shoulder 36 opposite to shoulder 35 and serving the function of preventing the load platform 20 arranged in the second raised position, in use, together with shoulder 35 itself, from translating in the longitudinal advancement direction of the motor vehicle 2.

Similarly to the shelves 30, the shelves 31 and 32 are also preferably integral with the respective side walls 5, for example may consist of an integral part of the structural covering of the respective side walls 5 themselves.

Lastly, according to that shown in FIGS. 1 and 5, in the mentioned raised tilted position, the load platform 20 is arranged with the front edge thereof 22 resting on the floor 4 and each side edge 23 slidingly engages a groove 37, which is defined by a through slot obtained through shelf 30 of the respective side wall 5. Each groove 37 has an inlet arranged on the horizontal surface 29 of the respective shelf 30, has an approximating width exceeding the thickness of the load platform 20 and is tilted, with respect to floor 4, by a sufficiently wide angle so as to allow access by an operator to the space below the load platform 20 when the load platform 20 is in the tilted position, to easily extract the spare wheel 10 from compartment 9. According to that shown in FIG. 5, the pitch angle of the grooves 37 is preferably approximately 45°. Moreover, it is worth noting that each shelf 33 is arranged at a distance from the respective shelf 31 such as not to interfere with the load plan 20 when the same is arranged in the tilted position.

It is clearly deduced from that disclosed above that the load platform 20 is completely detachable from each of the positions it is capable of taking on, and is completely removable from trunk 1. Moving the load platform 20 between the horizontal positions may be done very simply by grasping handle 25, lifting the load platform 20 and resting it on the support plans provided for each height level.

Then, in order to arrange the load platform 20 in the tilted position, it is sufficient to extract, at least partially, the load platform 20 from the trunk, align each side edge 23 with the inlet of groove 37 of the respective shelf 30 and let the load platform 20 slide downwards along the grooves 37 themselves until the front edge 22 is brought to rest on floor 4.

Figure 6:
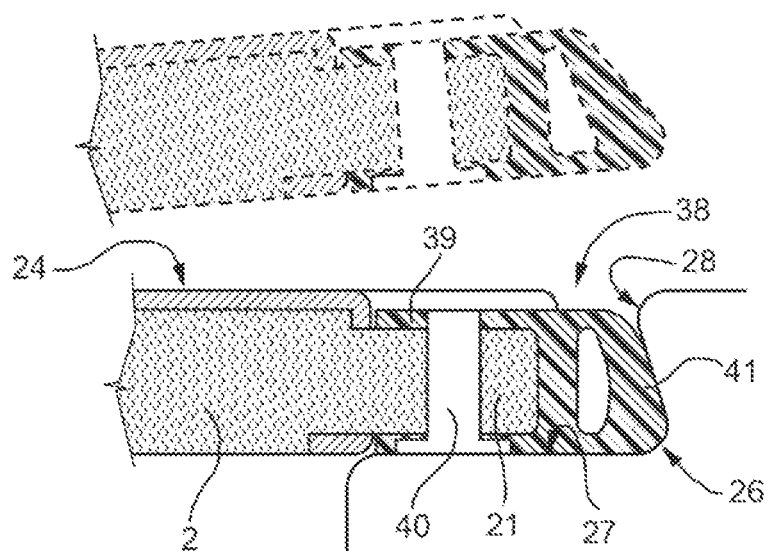
FIG. 6 shows a sectional view in enlarged scale, of a detail in FIG. 1.
Figure 7:
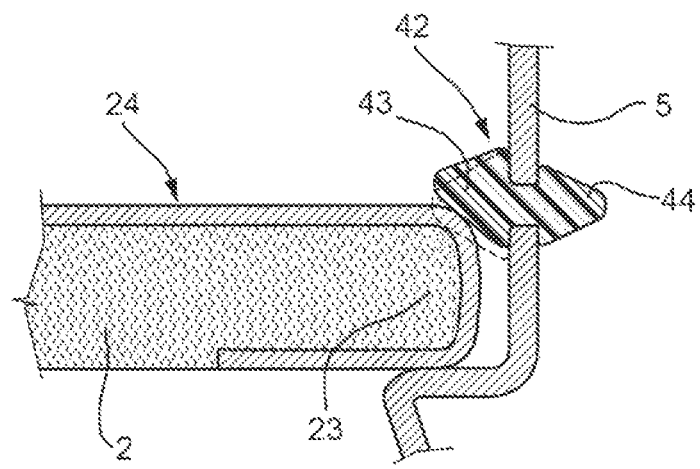
FIG. 7 shows a sectional view in enlarged scale, of a detail in FIG. 3.

According to that shown in FIGS. 6 and 7, trunk 1 is also equipped with press retaining means adapted to stably hold the load platform 20 in the first and in the second raised position and thereby to prevent the load platform 20 itself from overturning during the operation of the motor vehicle 2.

In particular, according to that shown in FIGS. 3 and 6, the load platform 20 in the first raised position is held in position by a pair of first retaining rubber elements 38, which are arranged along the rear edge 21 by opposite strips of handle 25 and each comprise a connection portion 39 rigidly connected to the rear edge 21 by means of a rivet 40, and a second portion of head 41 which is integral with the connection portion 39 and protruding in a cantilever fashion from the rear edge 21. In particular, according to that better shown in FIG.

6, the portion of head 41 of each retaining element 38 has a cuneiform shape tapered towards surface 24 and, when the load platform 20 is arranged in the first raised position by means of a movement from the top downwards, adapted to engage step 16 with interference, thus being elastically deformed (the deformed configuration is shown with dotted line in FIG. 6) in such a way as to block the load platform 20 in the first raised position and prevent the accidental lifting thereof during the operation of the motor vehicle 2. In order to make the holding action performed by the portion of head 41 more effective, surface 28 of step 26 is tilted with respect to the horizontal surface 27 in such a way as to define, with the latter, an undercut which prevents the portion of head 41, once brought into engagement with step 26, from being accidentally lifted upwards together with the load platform 20.

According to that shown in FIG. 4, the load platform 20, in the second raised position, is held in position by a pair of second retaining rubber elements 42 (of which only one is shown in the accompanying figures), each of which is connected to a respective side wall 5 above the related shelf 33 at a distance from the horizontal surface 34 a little smaller than the thickness of the load platform 20. According to that better shown in FIG. 7, each retaining element 42 is defined by a conical body 43, which is mounted on the respective side wall 5 by means of a connection portion 44 inserted with pressure through a hole made in the structural covering of the side wall 5 itself. The conical body 43 protrudes in a cantilever fashion from the side wall 5 so as to interfere with the trajectory of the respective side edge 23 when the load platform 20 is lowered towards the second raised position, and to be elastically deformed by the latter (the non-deformed configuration of the conical body 43 is shown in FIG. 7 with a dotted line). When the side edge 23 is arranged to rest on the horizontal surface 34, each conical body 43, which is deformed upwards, gives the load platform 20 a push downwards at the respective side edge 23, which is sufficient to prevent the accidental lifting of the load platform 20 during the operation of the motor vehicle 2.

The invention claimed is:

1. A trunk of a motor vehicle (2), the trunk (1) having an opening (6) accessible from outside and comprising a floor (4), two side walls (5) extending upwards from the floor (4), and a load platform (20) having a first edge (21) facing the opening (6), a second edge (22) substantially parallel to the first edge (21) and two side edges (23) substantially transversal to the first (21) and second (22) edge; the trunk (1) also comprising two first shelves (30), each of which is integral with a respective side wall (5), the first shelves (30) having respective top surfaces (29) defining a resting plane for the load platform (20) in a first raised position; and being characterized in that each said first shelf (30) has a respective groove (37) facing the groove (37) of the other first shelf (30) and adapted to be slidingly engaged by a respective said side edge (23) to result in the load platform (20) being arranged and maintained in a stable tilted position with respect to the floor (4) with the second edge (22) resting on the floor (4).

2. A trunk according to claim 1, wherein each said groove (37) is defined by a through slot obtained through the respective first shelf (30) and having an inlet arranged on said top surface (29).

3. A trunk according to claim 1, wherein each groove (37) is tilted, with respect to the floor (4), by a determined angle and has a constant width substantially equal, but more than, the thickness of the load platform (20).

4. A trunk according to claim 3, wherein said angle is such as to allow the access to the floor (4) through the opening (6) when the load platform (20) is in the tilted position.

5. A trunk according to claim 1, wherein the load platform (20) is completely detachable and removable from the trunk (1), and is manually positionable in the tilted position starting from any position previously taken on inside the trunk (1).

6. A trunk of a motor vehicle (2), the trunk (1) having an opening (6) accessible from outside and comprising a floor (4), two side walls (5) extending upwards from the floor (4), and a load platform (20) having a first edge (21) facing the opening (6), a second edge (22) substantially parallel to the first edge (21) and two side edges (23) substantially transversal to the first (21) and second (22) edge; the trunk (1) also comprising two first shelves (30), each of which is integral with a respective side wall (5), the first shelves (30) having respective top surfaces (29) defining a resting plane for the load platform (20) in a first raised position; and being characterized in that each said first shelf (30) has a respective groove (37) facing the groove (37) of the other first shelf (30) and adapted to be slidingly engaged by a respective said side edge (23) in order to arrange and keep the load platform (20) stable in a tilted position with respect to the floor (4), wherein the opening (6) is bottomly defined by an edge (8), which has a resting step (26) towards the inside of the trunk for the first edge (21) when the load platform (20) is arranged in the first raised position.

7. A trunk according to claim 6, and comprising first press retaining means (38) made to hold the load platform (20), in operation, in the first raised position and comprising some elastically deformable elements (41) integral with the load platform (20), protruding in a cantilever fashion from the first edge (21) and adapted to engage said step (26) with pressure.

8. A trunk according to claim 1, wherein each first shelf (30) has a bottom shoulder adapted to be engaged by the second edge (22) in order to define an end-stop for the load platform (20) arranged in the first raised position.

9. A trunk according to claim 1, wherein each first shelf (30) is integral with the respective side wall (5).

10. A trunk according to claim 1, wherein the load platform (20) is positionable in a second raised position at a greater distance from the floor (4) with respect to the one of the first raised position.

11. A trunk according to claim 10, and comprising, for each side wall (5), a further pair of shelves (31, 33), which define a substantially horizontal resting plane for the load platform (20) in said second raised position.

12. A trunk according to claim 11, wherein each further pair of shelves (31, 33) comprises a second shelf (31) and a third shelf (33), which are integral with the respective side wall (5), have respective top resting surfaces which are coplanar to each other and are arranged at a distance from each other so as not to interfere with the load platform (20) arranged in the tilted position.

13. A trunk according claim 12, wherein the second and the third shelf (31, 33) have respective bottom shoulders (35, 36) adapted to be engaged by the second edge (22) and by the first edge (21), respectively, in order to prevent accidental horizontal movements of the load platform (20) arranged in the second raised position.

14. A trunk according to claim 11, and comprising second press retaining means (42) made to hold the load platform (20), in use, in the second raised position and comprising two elastically deformable elements (43), each of which is integral with a respective side wall (5), and protruding in a cantilever fashion from the respective side wall (5) itself and adapted to engage a respective side edge (23) with pressure.

15. A trunk according to claim 12, wherein each second and third shelf (31, 33) is integral with the respective side wall (5).

* * * * *